United States Patent

Massara et al.

[11] Patent Number: 5,868,466
[45] Date of Patent: Feb. 9, 1999

[54] FLEXIBLE MEMBRANE BACK SUPPORT

[75] Inventors: Andrew J. Massara, Southfield; John Wainwright, Riverview, both of Mich.

[73] Assignee: Lear Corporation, Southfield, Mich.

[21] Appl. No.: 595,674

[22] Filed: Feb. 2, 1996

[51] Int. Cl.[6] .............................. A47C 7/46; B60N 2/22
[52] U.S. Cl. .......................................................... 297/284.6
[58] Field of Search ............................ 297/284.4, 284.6, 297/452.41, 408

[56] References Cited

U.S. PATENT DOCUMENTS

| | | |
|---|---|---|
| 1,007,985 | 11/1911 | Smith . |
| 3,145,054 | 8/1964 | Sopko, Jr. . |
| 3,762,769 | 10/1973 | Poschl ................................. 297/284.4 |
| 3,974,827 | 8/1976 | Bodeen . |
| 4,316,631 | 2/1982 | Lenz et al. ............................ 297/284.4 |
| 4,810,033 | 3/1989 | Kemmann ............................ 297/284.4 |
| 4,993,164 | 2/1991 | Jacobsen ......................... 297/284.4 X |
| 5,054,854 | 10/1991 | Pruit . |
| 5,076,643 | 12/1991 | Colasanti et al. ..................... 297/284.6 |
| 5,082,326 | 1/1992 | Sekido et al. ......................... 297/284.6 |
| 5,137,329 | 8/1992 | Neale ................................... 297/284.6 |
| 5,190,348 | 3/1993 | Colasanti ............................. 297/284.6 |
| 5,344,211 | 9/1994 | Adat et al. ....................... 297/284.4 X |

*Primary Examiner*—Peter R. Brown
*Attorney, Agent, or Firm*—MacMillan, Sobanski & Todd, LLC

[57] ABSTRACT

A seat (10) includes a backrest portion (16) and a seat portion (14) for supporting a cushion (12). The backrest portion (16) includes a back frame (18) which supports an expansion bladder (28) for expanding and retracting to provide lumbar support. A longitudinal plate (34) is fixedly connected to the frame (18) at a first end (36) and placed over the bladder (28) to provide lumbar support in response to selective expansion of the bladder (28). A second end (38) of the plate (34) is slidably connected within a rotatable member (46). The rotatable member (46) allows bending of the second end (38) to provide thoracic support separate from the lumbar support.

6 Claims, 2 Drawing Sheets

FLEXIBLE MEMBRANE BACK SUPPORT

TECHNICAL FIELD

The invention relates to an adjustable support assembly for use in the backrest of a seat, and more particularly, to an adjustable lumbar support and thoracic support for allowing the passenger of a motor vehicle to adjust the back seat cushion to a desired contour.

BACKGROUND OF THE INVENTION

Conventionally, lumbar support assemblies are used for maintaining a seat cushion in a contoured position. Such lumbar support assemblies usually include either bellows, air bladders, or a pump to force air into the cushion pocket to reach the desired contour. Alternatively, a semi-rigid mechanical structure which can be moved in a plurality of predetermined positions to adjust the contour of the seat in the lumbar area is also known.

U.S. Pat. No. 5,076,643, issued Dec. 31, 1991 in the name of Colasanti et al, and assigned to the assignee of the subject invention, discloses a lumbar support assembly having a seat frame with a pneumatic bladder supported thereon, and a contoured plate disposed over the bladder having a free end slidably engaged within guides. As the bladder is inflated or deflated, the plate responds thereto providing lumbar support as required.

U.S. Pat. No. 5,137,329, issued Aug. 11, 1992 in the name of Neale discloses an adjustable lumbar support including a rigid back plate and front plate which provides support. The contour of the front plate is generally concave, and a fluid actuator is placed between the plates to provide additional or less support.

U.S. Pat. No. 5,190,348 to Colasanti also discloses an inflatable bladder acting with an arcuate plate.

U.S. Pat. No. 3,145,054 and U.S. Pat. No. 5,054,854 disclose the use of multiple air bladders to provide selective support.

SUMMARY OF THE INVENTION

The invention is a seating assembly for supporting a seat cushion. The seating assembly comprises a seat back frame for supporting a seat cushion. Expansion means is connected to the seat back frame for moving between an extended position and a retracted position. A support plate is connected to the seat back frame and has first and second ends. The support plate includes a first portion operatively connected against the expansion means for extending outwardly from the seat back frame to a first distance in response to the expansion means being in the extended position and to a second distance in response to said expansion means being in the retracted position, and includes a second portion at the second end. The assembly is characterized by including rotating means operatively connected to the second portion of the support plate for pivoting and bending the second portion between an outward position extending outwardly from the seat back frame and an inward position extending in the seat back frame.

FIGURES IN THE DRAWINGS

Advantages of the present invention will be readily appreciated as the same becomes better understood by reference to the following detailed description when considered in connection with the accompanying drawings wherein.

DESCRIPTION OF THE PREFERRED EMBODIMENT

Figure 1:
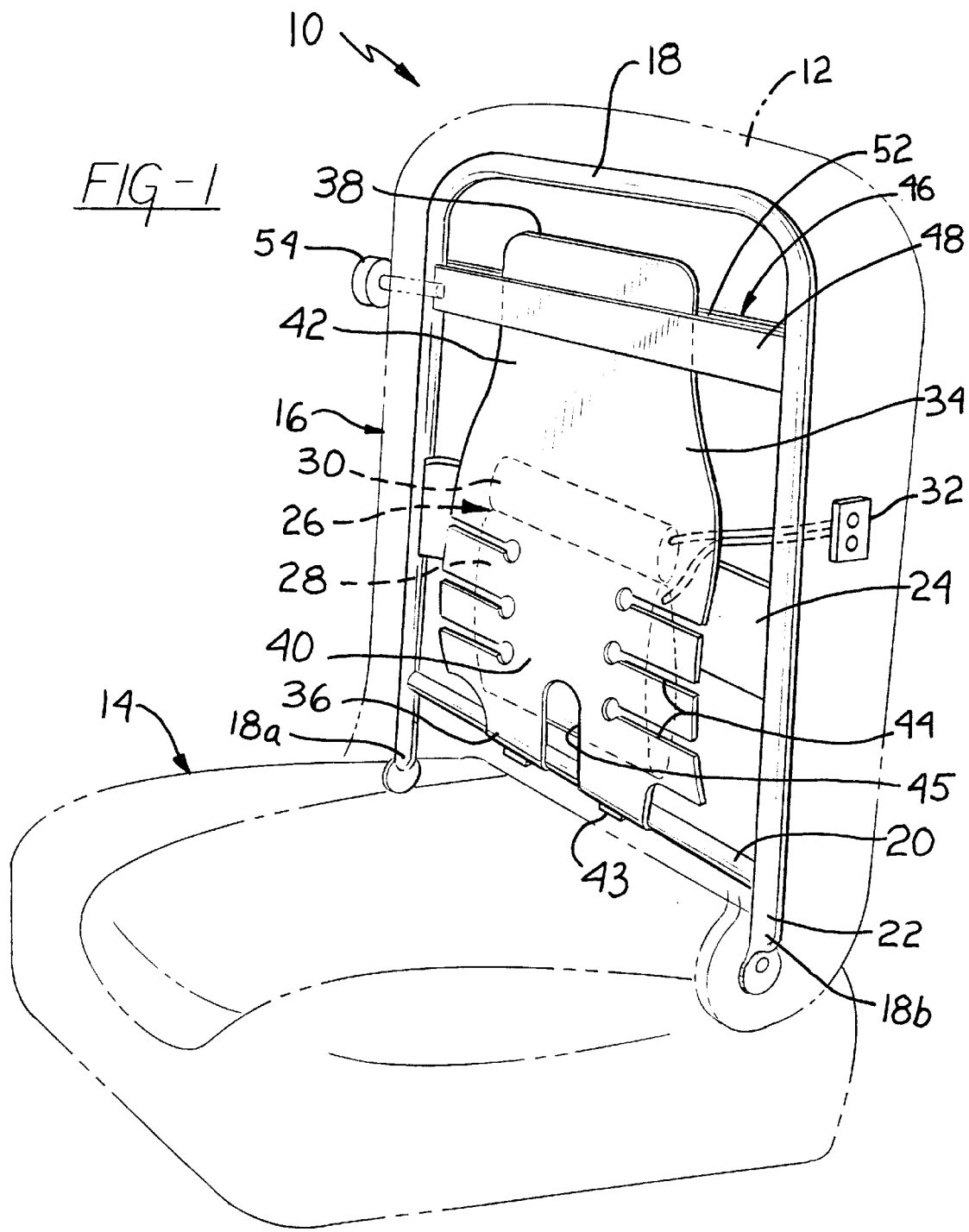
FIG. 1 is a respective view of the subject invention.

A seating assembly 10 for supporting a seat cushion 12 is generally illustrated in FIG. 1. The seating assembly 10 generally includes a seating portion 14 and backrest portion 16. The seating portion 14 and backrest portion 16 are operatively connected to one another to form the seating assembly 10 with a seat cushion 12 thereover. Such seating assembly 10 is generally utilized in a motor vehicle and may be mounted in a vehicle as commonly known in the art; however, it is to be understood that other applications are within the scope of the art.

The backrest portion 16 of the seating assembly 10 includes a seat back frame 18 for supporting the seat cushion 12 and occupant. The seat back frame 18 comprises a generally U-shaped rigid frame of suitable contour of the backrest portion 16. The seat back frame 18 also includes a lower cross bar 20 connected across the seat back frame 18 at its lower end 22 between the arms 18a, b of the U-shaped frame 18. The lower end 22 is connected to the seating portion 14 in a manner commonly known in the art. The seat back frame 18 also includes a central cross bar or plate 24 connected across the U-shaped frame 18 and parallel with the lower cross bar 20. The cross bars 20, 24 may be either welded or otherwise fixedly connected to the frame 18 as commonly known in the art.

The seating assembly 10 also includes 5 expansion means 26 connected to the seat back frame 18 for moving between an extended position and a retracted position. In the preferred embodiment, the expansion means 26 includes at least one fluid bladder 28 for receiving a fluid, such as air, to expand the bladder 28 between the extended and retracted positions. There is preferably a second fluid bladder 30 connected above the first fluid bladder 28 to allow further selective adjustment in the lumbar support area. Any number of bladders 28, 30 may be utilized to obtain the necessary support. The expansion means 26 may alternatively include pneumatic or mechanical actuation. The fluid bladders 28, 30 are connected to the frame 18 at the central cross bar or support plate 24. The cross bar 24 supports the bladders 28, 30 so that inflation and deflation thereof between the extended and retracted positions allows expansion and retraction outwardly from the frame 18.

The expansion means 26 also includes lumbar or first control means 32 connected to the fluid bladders 28, 30 to control the air into and out of the bladders 28, 30 in response to user 5 actuation. The first control means 32 may be as commonly available in other pneumatic or airbag controllers, such as the inclusion of pump and selectable user switch along with suitable control circuits.

Figure 2:
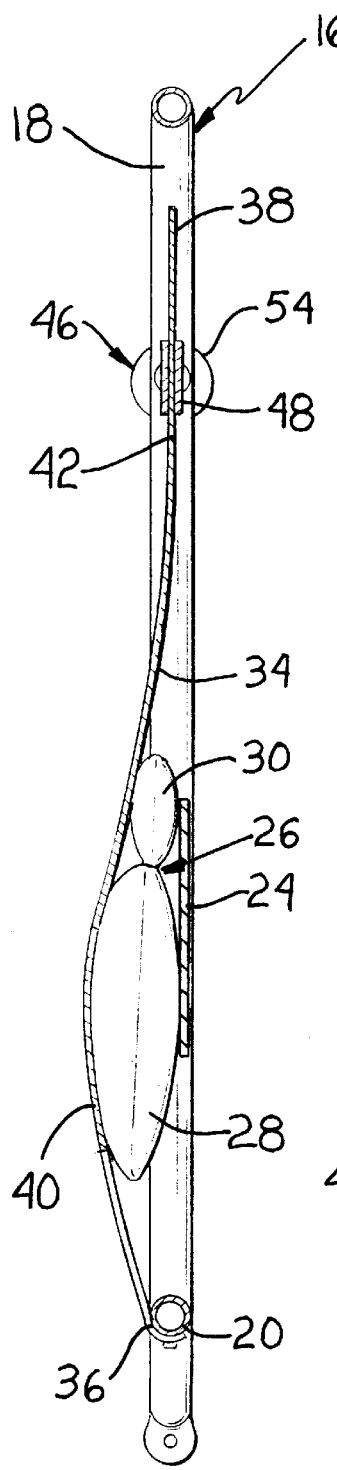
FIG. 2 is a side view showing a first position of the subject invention.

The seating assembly 10 also includes a flexible support plate 34 connected to the seat back frame 18 and having first 36 and second 38 ends. The support plate 34 is generally a longitudinally extending plate which extends longitudinally between the first end 36 and second end 38 and has a contour established by the expansion means 26. The support plate 34 includes a first portion 40 operatively connected against and over the expansion means 26 for deforming and extending outwardly from the seat back frame 18 and cross bar 24 to a first distance in response to the expansion means 26 being in the extended position (FIG. 3) and to a second distance in response to the expansion means 26 being in the retracted position (FIG. 2). The first portion 40 is generally adjacent the first end 36 and the central area of the support plate 34 lying over the expansion means 26. The first end 36 of the support plate 34 is fixedly connected to the seat back frame 18 at the, lower cross bar 20 by suitable fastening means 43. The second end 38 is freely movable.

The support plate 34 also includes a second portion 42 at the second end 38. The first portion 40 of the support plate 34 comprises a generally rectangular configuration which tapers slightly inwardly at a shoulder to a rectangular portion comprising the second portion 42 having a width less than the width of the rectangular portion of the first portion 40.

Therefore, it can be seen that as the 20 expansion means 26 is allowed to move between the extended and retracted positions, the free second end 38 allows the support plate 34 to be bent outwardly and retracted inwardly in response to the expansion means 26. The support plate 34 may be selectively contoured forming a generally S-shape. The support plate 34 lies against the expansion means 26 and directly responds to the movement forced by the expansion means 26.

The first portion 40 of the support plate 34 includes a plurality of parallel slots 44 extending traverse to the longitudinal length of the plate 34 inwardly from the sides. The slots 44 allow the first portion 40 to be more flexible providing rigidity in the central core area of the first portion 40 while allowing the sides thereof to be flexible to respond to the users movement. A center U-shaped cut-out 45 is provided in the first end 36 and extending longitudinally inwardly to allow bending and flexibility of the plate 34 at the first end 36 adjacent the connection.

The seating assembly 10 also includes rotating means 46 operatively connected to the second portion 42 of the support plate 34 for bending or pivoting the second end 38 and second portion 42 between an outward position extending outwardly from the seat back frame 18 and an inward position extending or aligned within said seat back frame 18. The rotating means 46 includes a rotatable bar 48 connected to the seat back frame 18 to slidably receive the second portion 42 therein. The rotatable bar 48 is rotated to a first position to pivot the second end 38 to the outward position, and to a second position to pivot the second end 38 to the inward position aligned with the seat back frame 18. The rotatable bar 48 generally comprises a pair of spaced plates or bars connected parallel with each other to provide a slot 52 for receiving the second end 38 freely slidable therethrough. The rotatable bar 48 is allowed to be rotated to move the second end 38 outwardly by bending the plate 34 or move the second end 38 straight, aligned with the seat back frame 18. It can be appreciated that the position of the rotatable bar 48 will affect the curvature of the entire support plate 34. It is to be understood that other types of rotating means 46 may be utilized as long as a pivot point is constant, and the bending of the second end 38 is allowed to occur, and sliding of the plate 34 therethrough.

The rotating means 46 includes thoracic or second control means 54 connected to the rotatable bar 48 for controlling the amount of rotation between the first and second positions selectable by a user. The second control means 54 may be a ratcheting or locking knob connected to the rotatable bar 48, or any other suitable control device which can rotate the bar 48 and maintain the bar 48 in its rotated or selected position.

Figure 3:
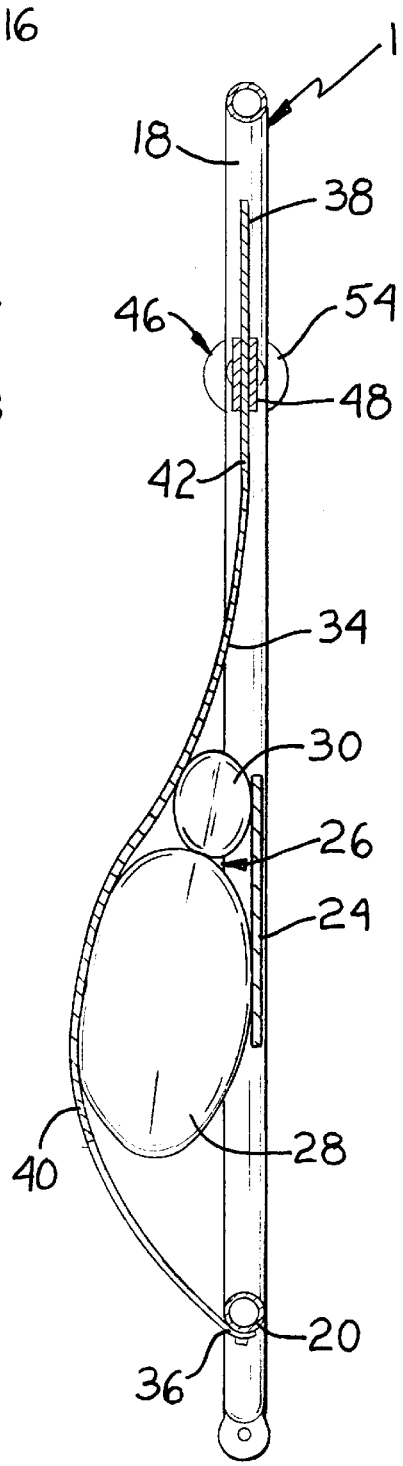
FIG. 3 is a side view showing a second position of the subject invention.
Figure 4:
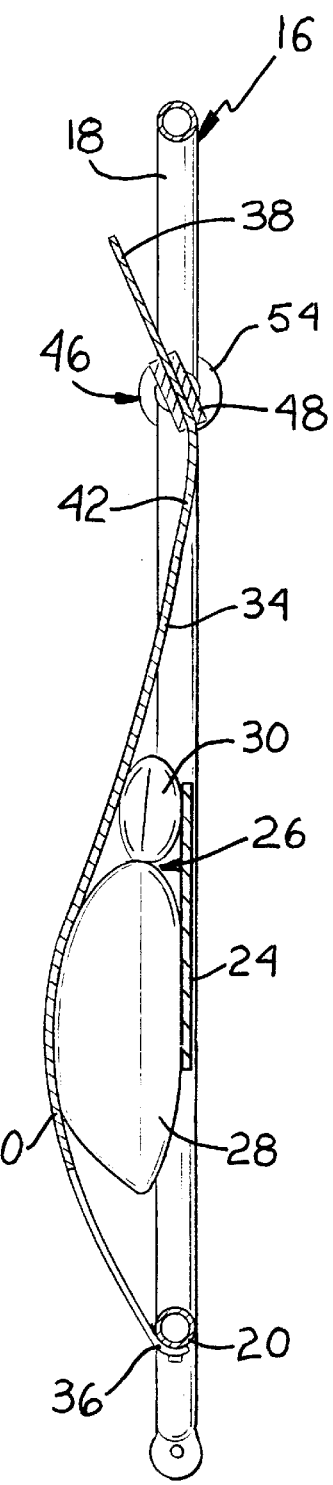
FIG. 4 is a side view showing a third position of the subject invention.

In operation, various contours of the support plate 34 may be acquired, some of which are illustrated in FIGS. 2–4. In FIG. 2, the expansion means 26 is selected to the retracted position providing minimum lumbar support and support plate 34 has slight contour thereto, and the second end 38 aligned with the seat back frame 18.

FIG. 3 illustrates the expansion means 26 in the extended position with the support plate 34 deformed significantly thereabout. Again, the rotating means 46 is in the second position with the second end 38 aligned with the seat back frame 18.

FIG. 4 illustrates the expansion means 26 in the retracted position with the rotating means 46 in the first position providing thoracic support.

The seating assembly 10 employs the natural bending characteristics of the plate 34 or similar flexible membrane to provide continuous support over the occupants lumbar and thoracic regions. The expansion means 26, whether pneumatic and mechanical, adjusts the lumbar apex height, shape of "S" curvature, the degree of thoracic interface, and forward deflection. Multiple air bladders 28, 30 placed in various locations in conjunction with a means of rotating the angle of the upper portion of the membrane, provides a "four way" like adjustment of the contours.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A seating assembly (10) for supporting a seat cushion, said assembly comprising:

a seat back frame (18) for supporting a seat cushion (12);

an expansion member (26) including at least one fluid bladder (28) connected to said seat back frame (18) for receiving fluid to expand said bladder (28) between an extended position and a retracted position;

a support plate (34) connected to said seat back frame (18) and having first and second ends (36, 38);

said support plate (34) including a first portion (40) operatively connected against said expansion member (26) for extending outwardly from said seat back frame (18) to a first distance in response to said expansion member (26) being in said extended position and to a second distance in response to said expansion member (26) being in said retreated position, and a second portion (42) at said second end (38); and including a rotating member (46) operatively connected to said second portion (42) of said support plate (34) for pivoting and bending said second portion (42) between an outward position extending outwardly from said seat back frame (18) and an inward position extending in said seat back frame (18).

2. An assembly as set forth in claim 1 further including a frame fastening member (43) for fixedly connecting said first and (36) to said seat back frame (18).

3. An assembly as set forth in claim 2 wherein by said support plate (34) including a plurality of parallel slots (52) formed in said first portion (40) to increase flexibility of said support plate (34).

4. An assembly as set froth in claim 1 wherein said expansion member (26) includes a first control member connected to said expansion member (26) to control the fluid into and out of said bladder (28) in response to user selection.

5. An assembly as set forth in claim 4 wherein by said rotating member (46) including a rotatable bar (48) connected to said seat back frame (18) to slidably receive said second portion (42), said rotatable bar (48) being rotated between a first position to pivot said second end (38) to said outward position and a second position to pivot said second end (38) to said inward position aligned with said seat back frame (18).

6. An assembly as set forth in claim 5 wherein said rotating member (46) includes a second control member (54) connected to said rotatable bar (48) for controlling the amount of rotation between said first and second positions selectable by a user.

* * * * *